US012776883B2

(12) United States Patent
Matsumura et al.

(10) Patent No.: US 12,776,883 B2
(45) Date of Patent: Oct. 27, 2026

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 267 days.

(21) Appl. No.: 18/715,003

(22) PCT Filed: Dec. 2, 2021

(86) PCT No.: PCT/JP2021/044268

§ 371 (c)(1),
(2) Date: May 30, 2024

(87) PCT Pub. No.: WO2023/100317

PCT Pub. Date: Jun. 8, 2023

(65) Prior Publication Data

US 2026/0155936 A1 Jun. 4, 2026

(51) Int. Cl.

*H04L 5/00* (2006.01)
*H04W 24/10* (2009.01)
*H04W 56/00* (2009.01)

(52) U.S. Cl.

CPC ........... *H04L 5/0053* (2013.01); *H04W 24/10* (2013.01); *H04W 56/0045* (2013.01)

(58) Field of Classification Search

CPC .. H04L 5/0053; H04W 24/10; H04W 56/0045
See application file for complete search history.

(56) References Cited

U.S. PATENT DOCUMENTS

2023/0030177 A1* 2/2023 Cui ........................... H04L 5/14
2023/0088959 A1* 3/2023 Tian ...................... H04L 1/1887
370/329

OTHER PUBLICATIONS

Apple Inc., Discussion on RRM requirements for L1/L2 Centric Mobility and Unified TCI, Aug. 16-27, 2021, 3GPP, R4-2112109, pp. 6-7.*
Office Action issued in Japanese Patent Application No. 2023-564364, dated Aug. 5, 2025 (7 pages).
International Search Report issued in PCT/JP2021/044268 on Jul. 12, 2022 (3 pages).
Written Opinion of the International Searching Authority issued in PCT/JP2021/044268 on Jul. 12, 2022 (3 pages).

(Continued)

*Primary Examiner* — Michael Thier
*Assistant Examiner* — Tracy Lauren Raimondo
(74) *Attorney, Agent, or Firm* — Osha Bergman Watanabe & Burton LLP

(57) ABSTRACT

A terminal according to an aspect of the present disclosure includes: a receiving section that receives any one reference signal of a plurality of reference signals that are transmitted in a same period and that correspond to different cells; and a control section that controls at least one of restriction on transmission or reception of a specific channel or signal and update on transmission Configuration Indication (TCI) state switching delay. According to an aspect of the present disclosure, it is possible to appropriately perform processing in a case where resources/occasions of reference signals overlap with each other between different PCIs/cells.

4 Claims, 11 Drawing Sheets

(56) References Cited

OTHER PUBLICATIONS

Apple Inc.; "Discussion on RRM requirements for L1/L2 Centric Mobility and Unified TCI"; 3GPP TSG-RAN WG4 Meeting #100-e, R4-2112109; Electronic Meeting; Aug. 16-27, 2021 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1:3GPP TS 36.300 V 8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), it is assumed that a terminal (user terminal, User Equipment (UE)) controls communication on the basis of at least one of inter-cell mobility between a plurality of cells including a non-serving cell and inter-cell mobility using a plurality of transmission/reception points (for example, multiple TRPs (Multi-TRP (MTRP)).

Processing (for example, scheduling restriction/switching delay for a TCI state) in a case where resources/occasions of reference signals (for example, SSBs) overlap with each other between different physical cell IDs (PCIs)/cells (for example, between a serving cell and a non-serving cell) is not clear. This may cause degradation in communication quality, throughput reduction, and the like.

In view of this, an object of the present disclosure is to provide a terminal, a radio communication method, and a base station that appropriately perform processing in a case where resources/occasions of reference signals overlap with each other between different PCIs/cells.

Solution to Problem

A terminal according to an aspect of the present disclosure includes: a receiving section that receives any one reference signal of a plurality of reference signals that are transmitted in a same period and that correspond to different cells; and a control section that controls at least one of restriction on transmission or reception of a specific channel or signal and update on transmission Configuration Indication (TCI) state switching delay.

Advantageous Effects of Invention

According to an aspect of the present disclosure, it is possible to appropriately perform processing in a case where resources/occasions of reference signals overlap with each other between different PCIs/cells.

BRIEF DESCRIPTION OF DRAWINGS

FIG. 4 FIGS. 4A and 4B are each a diagram to show an example of inter-cell mobility.

Figure 1:
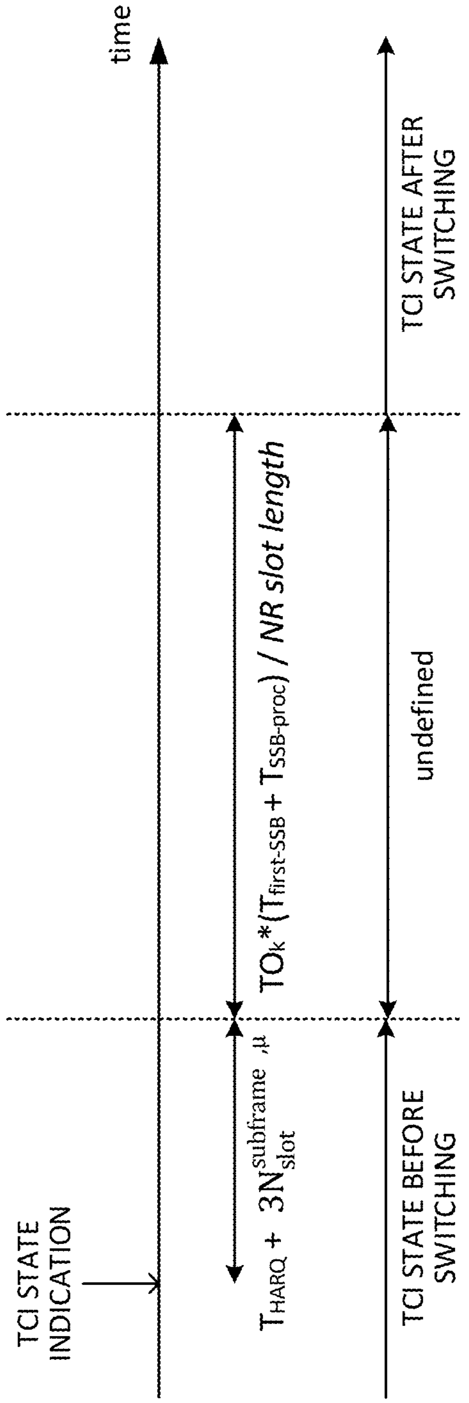
FIG. 1 is a diagram to show an example of switching/activation of a known TCI state defined in Rel. 15/16 or earlier versions.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in a UE, based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter.

Information of QCL as indicated in QCL types A to D described above may be referred to as a QCL property.

A case that the UE assumes that a given control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to OCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS in a relationship of QCL type X with (a DMRS of) a given channel/signal, and this RS may be referred to as a QCL source of QCL type X in the TCI state.

(TCI State Switching)

In Rel. 15/16, for a UE configured with one or more TCI states on a serving cell, a delay time for switching of an active TCI state is defined.

It is preferable for the UE and a network (NW) to have a common recognition of whether a TCI state is known (already known) or unknown (not already known). However, even if the UE measures/stores/holds a QCL property, it is not possible for the network (NW, for example, base station) to recognize whether the UE measures/stores/holds any QCL property unless the UE performs L1-RSRP reporting/beam reporting to the NW. When the UE performs beam/RS measurement and reporting, the TCI state is made known.

In Rel. 16, a TCI state is assumed to be known when an RS resource for L1-RSRP measurement is an RS of a target TCI state or an RS having a QCL relationship with the target TCI state, and Condition 1 to Condition 5 below are met during a period from the last transmission of an RS resource to be used for reporting of L1-RSRP measurement of the target TCI state to completion of active TCI state switching (TCI state switching period);

(Condition 1): A TCI state switch command is received within 1280 ms from the last transmission of the RS resource for beam reporting or measurement.

(Condition 2): The UE transmits, before the TCI state switch command, at least one L1-RSRP report for the target TCI state.

(Condition 3): The TCI state remains detectable during the TCI state switching period.

(Condition 4): An SSB associated with the TCI state remains detectable during the TCI state switching period.

(Condition 5) Signal to Noise Ratio (SNR) of the TCI state is −3 dB or higher.

When a TCI state is unknown, this means that the TCI state is not known.

Note that, in the present disclosure, a TCI state that is known may be referred to as a "known TCI state" and a TCI state that is unknown may be referred to as an "unknown TCI state." As described above, in order for the UE and the base station to have a common recognition of "known" or "unknown," reporting of the measurement result is required. Even if the UE measures/stores a QCL property, it is not possible for the base station to know whether the UE measures/stores any QCL property unless the UE reports an L1-RSRP report.

<Known TCI State Switching Delay>

In a case where a MAC CE is used for TCI state switching (MAC-CE based TCI state switch) and a target TCI state (a TCI state of a switching destination) is a known TCI state, a UE, upon receiving a physical downlink shared channel (PDSCH) including an activation command for a TCI state (TCI state indication) by the MAC CE at slot n, receives a physical downlink control channel (PDCCH) of the target TCI state on a serving cell on which TCI state switching occurs at the first slot after slot $n+T_{HARQ}+3N^{subframe,\ \mu_{slot}}+TO_k*(T_{first\text{-}SSB}+T_{SSB\text{-}proc})/(\text{NR slot length})$. The UE can receive a PDCCH of an old TCI state (before switching) until slot $n+THARQ+3N^{subframe,\ \mu_{slot}}$. In a period from slot $n+T_{HARQ}+3N^{subframe,\ \mu_{slot}}$ to slot $n+T_{HARQ}+3N^{subframe,\ \mu_{slot}}+TO_K*(T_{first\text{-}SSB}+T_{SSB\text{-}proc})/(\text{NR slot length})$, a TCI state applied by the UE is undefined (see FIG. 1).

Here, $T_{HARQ}$ indicates a timing from reception/transmission of a downlink data signal (for example, PDSCH) to transmission/reception of transmission confirmation information (for example, HARQ-ACK information). $N^{subframe,\ \mu_{slot}}$ indicates the number of slots per subframe for a subcarrier configuration μ. $T_{first\text{-}SSB}$ is a time period until the first SSB is transmitted after a MAC CE command used for activation of a TCI state is decoded by the UE. $T_{SSB\text{-}proc}$ is 2 ms. $TO_k$ is 1 if the target TCI state is not included in a list of active TCI states for the PDSCH, or 0 otherwise. NR slot length indicates a slot length.

Figure 2:
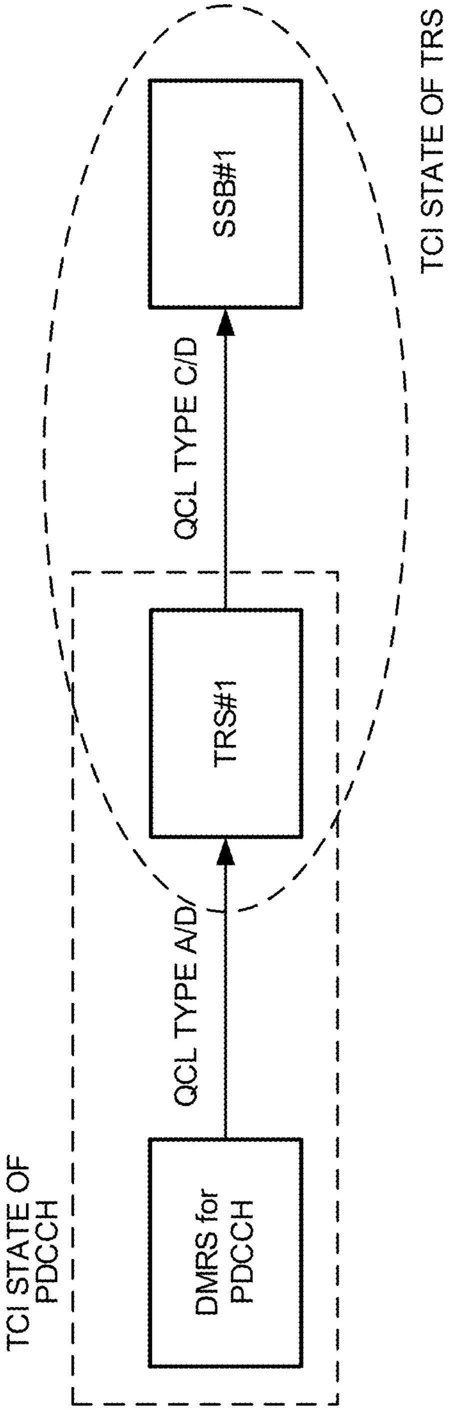
FIG. 2 is a diagram to show an example of a TCI state defined in Rel. 16 or earlier versions.

FIG. 2 is a diagram to show an example of a TCI state defined in Rel. 16 or earlier versions. As shown in FIG. 2, a TCI state of a PDCCH indicates a relationship of QCL type A/D between a demodulation reference signal (DMRS) for the PDCCH and a TRS (or CSI-RS, here, TRS #1). A TCI state of the TRS indicates a relationship of QCL type C/D between the TRS and an SSB (here, SSB #1).

<Unknown TCI State Switching Delay>

Figure 3:
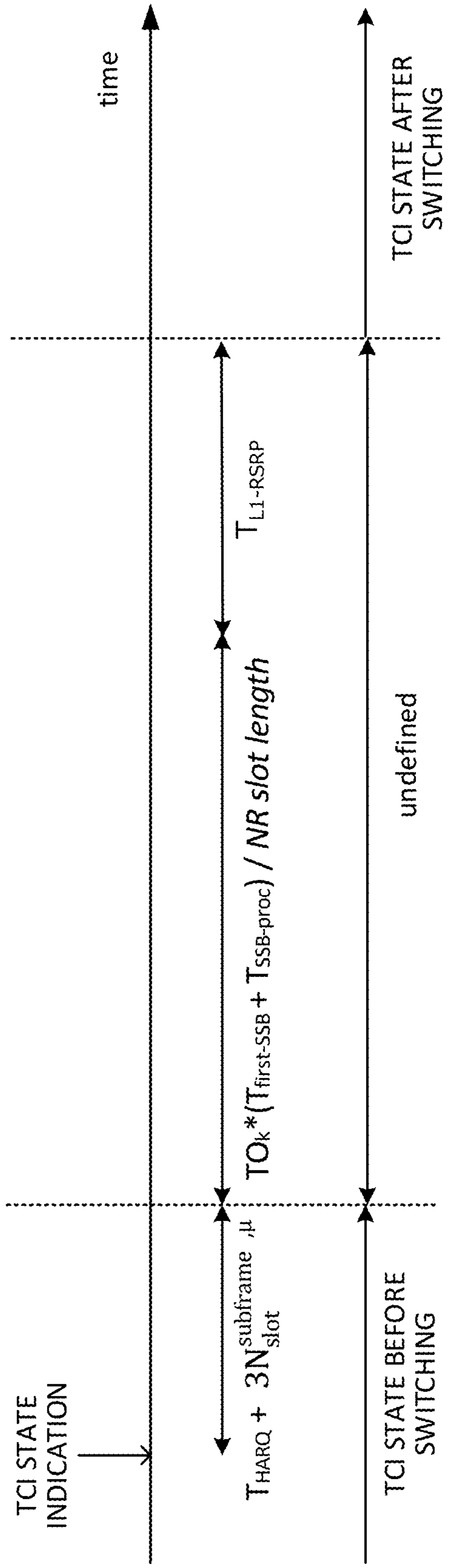
FIG. 3 is a diagram to show an example of switching/activation of an unknown TCI state defined in Rel. 15/16 or earlier versions.

In a case where a MAC CE is used for TCI state switching and a target TCI state is an unknown TCI state, a UE, upon receiving a PDSCH including an activation command for a TCI state by the MAC CE at slot n, receives a PDCCH of the target TCI state on a serving cell on which TCI state switching occurs at the first slot after slot $n+T_{HARQ}+3N^{subframe,\ \mu_{slot}}+T_{L1\text{-}RSRP}+TO_{uk}*(T_{first\text{-}SSB}+T_{SSB\text{-}proc})$/(NR slot length). The UE can receive a PDCCH of an old TCI state (before switching) until slot $n+T_{HARQ}+3N^{subframe,\ \mu_{slot}}$ (see FIG. 3).

Here, $TO_{uk}$ is 1 for L1-RSRP measurement using a CSI-RS or for switching of a TCI state configured with a QCL type other than QCL type D. On the other hand, $TO_{uk}$ is 0 for a case of switching of a TCI state configured with at least QCL type D and of L1-RSRP measurement using an SSB.

$T_{first\text{-}SSB}$ is a time period until an SSB is firstly transmitted after the L1-RSRP measurement in a case of performing switching of a TCI state configured with at least QCL type D. Alternatively, $T_{first\text{-}SSB}$ denotes a time period until an SSB is firstly transmitted after a MAC CE command used for activation of a TCI state configured with a QCL type other than QCL type D is decoded by the UE.

As compared with a case where the target TCI state is a known TCI state, a case where the target TCI state is an unknown TCI state additionally requires a time period of $T_{L1\text{-}RSRP}$ for TCI state switching. $T_{L1\text{-}RSRP}$ is a time period related to received power measurement. $T_{L1\text{-}RSRP}$ is 0 for frequency range 1 (FR1) or for FR2 without QCL type D being configured. Otherwise, $T_{L1\text{-}RSRP}$ is a time period required for determination/refinement of a receive beam in FR2.

<TCI Switching Delay in Case of Using DCI>

In a case where downlink control information (DCI) is used for TCI state switching (DCI based TCI state switch) and the target TCI state is a known TCI state, when a higher layer parameter tci-PresentInDCI for a CORESET for scheduling of a PDSCH is configured as "enabled" for the UE at slot n, a PDSCH of the target TCI state on a serving cell on which TCI state switching occurs is received at the first slot after slot n+timeDurationForQCL. Here, timeDurationForQCL is a time period required for the UE to receive a PDCCH and to apply information related to spatial QCL (spatial QCL information) received in DCI for processing of the PDSCH.

<TCI Switching Delay in Case of Using RRC Signaling>

Furthermore, in a case where RRC signaling is used for TCI state switching (RRC based TCI state switch) and the target TCI state is a known TCI state, a UE, upon receiving a PDSCH carrying an RRC activation command for a TCI state at slot n, can receive a PDCCH of the target TCI state on a serving cell on which TCI state switching occurs at the first slot after slot $n+(T_{RRC\_processing}+TO_k*(T_{first\text{-}SSB}+T_{SSB\text{-}proc}))$/(NR slot length).

Here, $T_{RRC\_processing}$ denotes delay (RRC processing delay) related to an RRC process. $T_{first\text{-}SSB}$ denotes a time period until an SSB is firstly transmitted after the RRC process by the UE. The SSB is of QCL type A or QCL type C for the target TCI state. $T_{SSB\text{-}proc}$, $TO_k$, and (NR slot length) are similar to those of a case of a known TCI state in TCI state switching using a MAC CE. The UE is not required to receive any PDCCH/PDSCH/CSI-RS or transmit any PUCCH/PUSCH until the end of the switching period.

In a case where RRC signaling is used for TCI state switching (RRC based TCI state switch) and the target TCI state is an unknown TCI state, a UE, upon receiving a PDSCH carrying an RRC activation command for a TCI state at slot n, can receive a PDCCH of the target TCI state on a serving cell on which TCI state switching occurs at the first slot after slot $n+(T_{RRC\_processing}+T_{L1\text{-}RSRP}+TO_{uk}*(T_{first\text{-}SSB}+T_{SSB\text{-}proc}))$/(NR slot length).

Here, $T_{RC\_processing}$ denotes delay (RRC processing delay) related to an RRC process. $T_{SSB\text{-}proc}$, $TO_{uk}$, and (NR slot length) are similar to those of a case of an unknown TCI state in TCI state switching using a MAC CE. The UE is not required to receive any PDCCH/PDSCH/CSI-RS or transmit any PUCCH/PUSCH until the end of the switching period.

$T_{first\text{-}SSB}$ is a time period until an SSB is firstly transmitted after the L1-RSRP measurement in a case of performing switching of a TCI state configured with at least QCL type D. Alternatively, $T_{first\text{-}SSB}$ denotes a time period until an SSB is firstly transmitted after a MAC CE command used for activation of a TCI state configured with a QCL type other than QCL type D is decoded by the UE. The SSB is of QCL type A or QCL type C for the target TCI state.

The switching delay similar to the above is defined also for a UL spatial relation and pathloss (PL)-RS.

(Inter-Cell Mobility)

For NR, it is under study that one or a plurality of transmission/reception points (TRPs) (multiple TRPs (Multi-TRP (MTRP))) perform a DL transmission to a UE. It is also under study that a UE performs a UL transmission to one or a plurality of TRPS.

Figure 4A:
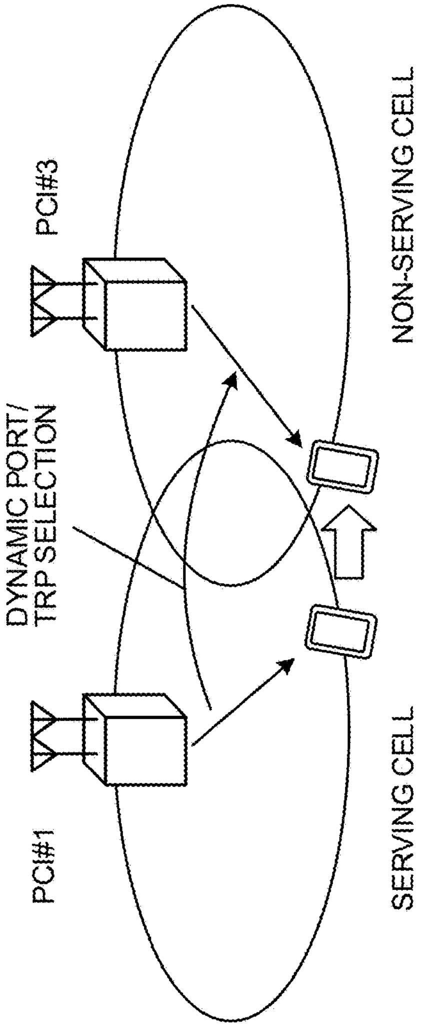
Figure 4B:
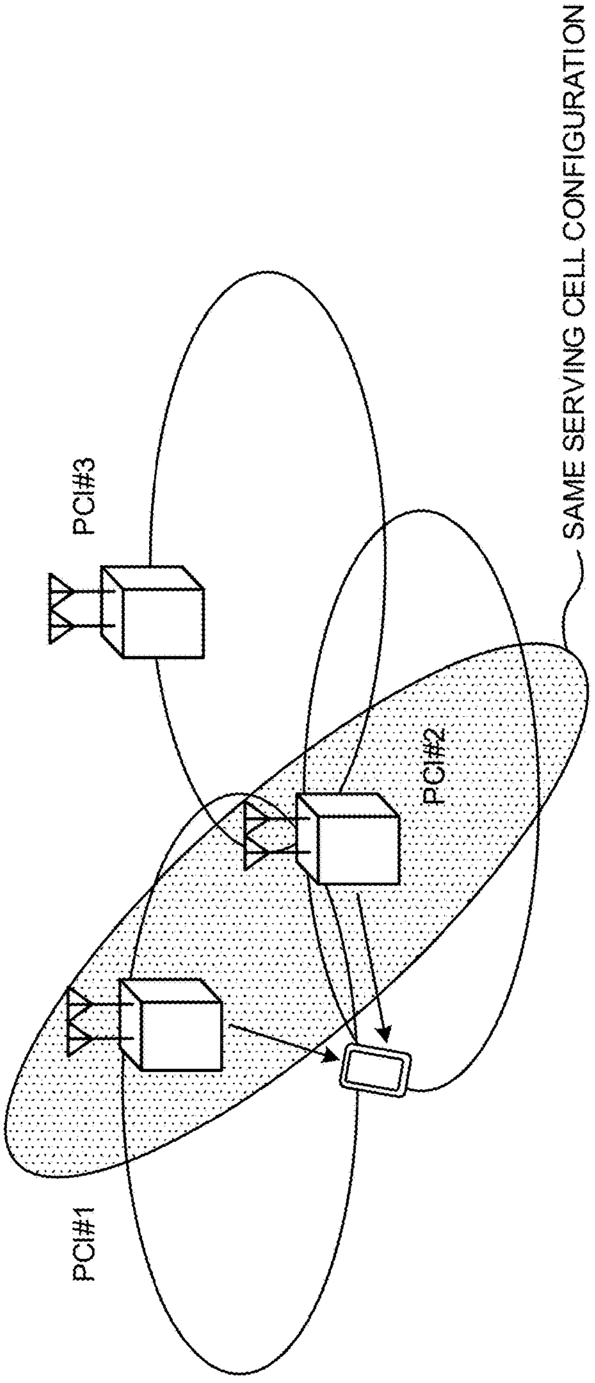

A UE is considered to receive channels/signals from a plurality of cells/TRPs in inter-cell mobility (for example, L1/L2 inter cell mobility) (see FIGS. 4A and 4B).

FIG. 4A shows an example of inter-cell mobility (for example, Single-TRP inter-cell mobility) including a non-serving cell. A UE may be configured with one TRP (or single-TRP) in each cell. Here, a case is shown where the UE receives channels/signals from a base station/TRP in cell #1 being a serving cell and a base station/TRP in cell #3 not being a serving cell (being a non-serving cell). For example, this corresponds to a case where the UE switches/changes from cell #1 to cell #3 (for example, fast cell switch).

In this case, selection of a port (for example, antenna port)/TRP may be dynamically performed. The selection of the port (for example, antenna port)/TRP may be performed based on a TCI state indicated or updated by DCI/MAC CE. Here, a case is shown where configurations of different physical cell IDs (for example, PCIs) are supported for cell #1 and cell #3.

FIG. 4B shows an example of multi-TRP scenario (for example, inter-cell mobility with use of multiple TRPs (Multi-TRP inter-cell mobility), inter-cell multi-TRP) A UE may be configured with a plurality of (for example, two) TRPs (or different CORESET pool indices) for each cell. Here, a case is shown where the UE receives channels/ signals from TRP #1 and TRP 2. Here, a case is shown where TRP #1 corresponds to physical cell ID (PCI) #1 and TRP #2 corresponds to PCI #2.

The multiple TRPs (TRPs #1 and #2) may be connected by an ideal/non-ideal backhaul, and information, data, and the like may be exchanged between the TRPs. Each TRP of the multiple TRPs may transmit a same or different codeword (Code Word (CW)) and a same or different layer. As one form of the multi-TRP transmission, non-coherent joint transmission (NCJT) may be used as shown in FIG. 4B. Here, a case is shown where NCJT is performed between TPRs corresponding to different PCIs. Note that the same serving cell configuration may be applied/configured for TRP #1 and TRP #2.

A plurality of PDSCHs (multiple PDSCHs) transmitted by NCJT may be defined to partially or completely overlap with each other in at least one of the time domain and frequency domain. In other words, a first PDSCH from TRP #1 and a second PDSCH from TRP #2 may overlap with each other in at least one of time and frequency resources. The first PDSCH and second PDSCH may be used for transmission of the same TB or may be used for transmission of different TBs.

It may be assumed that these first PDSCH and second PDSCH are not in a quasi-co-location (QCL) relationship with each other (not quasi-co-located). Reception of the multiple PDSCHs may be interpreted as simultaneous reception of PDSCHs of a QCL type other than a given QCL type (for example, QCL type D).

The plurality of PDSCHs from the multiple TRPs (which may be referred to as multiple PDSCHs) may be scheduled using one DCI (single-DCI (S-DCI), single-PDCCH) (single master mode). One DCI may be transmitted from one TRP of the multiple TRPs. A configuration where multiple TRPs use one DCI may be referred to as single-DCI based multi-TRP (mTRP/MTRP).

The plurality of PDSCHs from the multiple TRPs may be scheduled using respective DCIs (multi-DCI (M-DCI), multi-PDCCH (multiple PDCCHs)) (multi-master mode). The DCIs may be transmitted from the multiple respective TRPs. A configuration where multiple TRPs use DCIs may be referred to as multi-DCI based multi-TRP (mTRP/MTRP).

It may be assumed that the UE transmits, to the different TRPs, different CSI reports related to the respective TRPs. Such CSI feedback may be referred to as separate feedback, separate CSI feedback, and the like. In the present disclosure, "separate" may be interchangeably interpreted as "independent."

(Analysis)

For NR in Rel. 17 or later versions, it is assumed that a beam indication to TCI states associated with different PCIs is supported by a MAC CE/DCI. For NR in Rel. 18 or later versions, it is assumed that an indication of change of a serving cell to a cell with a different PCI is supported by a MAC CE/DCI.

Note that, in Rel. 15/16, when an SSB and a PDCCH/PDSCH/CSI-RS are the same or different in subcarrier spacing and this is supported in a UE capability, there is no scheduling restriction on a symbol of the SSB for L1-RSRP measurement. For example, with respect to scheduling in a UE that performs L1-RSRP measurement in a case of FR1-FR2 inter-band carrier aggregation (CA), there is no scheduling restriction on an FR2 serving cell for L1-RSRP measurement to be performed on a serving cell under Clear Channel Assessment (CCA). In this case, for example, the UE may receive a PDCCH/PDSCH/CSI-RS by using the same receive beam and measure an SSB for L1-RSRP.

For future radio communication systems (for example, Rel. 17 or later versions), processing (for example, scheduling restriction/switching delay for a TCI state) in a case where resources/occasions of reference signals (for example, SSBs) overlap with each other between different PCIs/cells (for example, between a serving cell and a non-serving cell) is not clear. For example, how L1-RSRP measurement for an SSB is performed is not clear. This may cause degradation in communication quality, throughput reduction, and the like.

In view of this, the inventors of the present invention came up with the idea of a method of appropriately performing processing in a case where resources/occasions of reference signals overlap with each other between different PCIs/cells.

Embodiments according to the present disclosure will be described in detail with reference to the drawings as follows. The radio communication methods according to respective embodiments may each be employed individually, or may be employed in combination.

In the present disclosure, "A/B" and "at least one of A and B" may be interchangeably interpreted. In the present disclosure, "A/B/C" may mean "at least one of A, B, and C."

In the present disclosure, activate, deactivate, indicate, select, configure, update, determine, and the like may be interchangeably interpreted. In the present disclosure, "support," "control," "controllable," "operate," "operable," and the like may be interchangeably interpreted.

In the present disclosure, radio resource control (RRC), an RRC parameter, an RRC message, a higher layer parameter, an information element (IE), a configuration, and the like may be interchangeably interpreted. In the present disclosure, a Medium Access Control control element (MAC Control Element (CE)), an update command, an activation/deactivation command, and the like may be interchangeably interpreted.

In the present disclosure, the higher layer signaling may be, for example, any one or combinations of Radio Resource Control (RRC) signaling, Medium Access Control (MAC) signaling, broadcast information, and the like.

In the present disclosure, the MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, the physical layer signaling may be, for example, downlink control information (DCI), uplink control information (UCI), or the like.

In the present disclosure, an index, an identifier (ID), an indicator, a resource ID, and the like may be interchangeably interpreted. In the present disclosure, a sequence, a list, a set, a group, a cluster, a subset, and the like may be interchangeably interpreted.

In the present disclosure, a panel, a UE panel, a panel group, a beam, a beam group, a precoder, an Uplink (UL) transmission entity, a transmission/reception point (TRP), a base station, spatial relation information (SRI), a spatial relation, an SRS resource indicator (SRI), a control resource set (CORESET), a Physical Downlink Shared Channel (PDSCH), a codeword (CW), a transport block (TB), a reference signal (RS), an antenna port (for example, a demodulation reference signal (DMRS) port), an antenna port group (for example, a DMRS port group), a group (for example, a spatial relation group, a code division multiplexing (CDM) group, a reference signal group, a CORESET group, a Physical Uplink Control Channel (PUCCH) group, a PUCCH resource group), a resource (for example, a reference signal resource, an SRS resource), a resource set (for example, a reference signal resource set), a CORESET pool, a downlink Transmission Configuration Indication state (TCI state) (DL TCI state), an uplink TCI state (UL TCI state), a unified TCI state, a common TCI state, quasi-co-location (QCL), QCL assumption, a TCI state, and the like may be interchangeably interpreted.

An example in the present disclosure may be applied to inter-cell mobility (for example, L1/L2 inter cell mobility) or applied to communication control other than inter-cell mobility.

In the present disclosure, a single TRP, single DCI, a single PDCCH, multi-TRP based on single-DCI, a single-TRP system, single-TRP transmission, a single PDSCH, a channel using a single TRP, a channel using one TCI state/spatial relation, multi-TRP being not enabled by RRC/DCI, a plurality of TCI states/spatial relations being not enabled by RRC/DCI, one CORESET pool index (CORESETPoolIndex) value being not configured for any CORESET and any codepoint of a TCI field being not mapped to two TCI states, and two TCI states on at least one TCI codepoint being activated may be interchangeably interpreted.

In the present disclosure, multi-TRP, a multi-TRP system, multi-TRP transmission, multiple PDSCHs, a channel using multi-TRP, a channel using a plurality of TCI states/spatial relations, multi-TRP being enabled by RRC/DCI, a plurality of TCI states/spatial relations being enabled by RRC/DCI, and at least one of multi-TRP based on single DCI and multi-TRP based on multi-DCI may be interchangeably interpreted. In the present disclosure, multi-TRP based on multi-DCI and one CORESET pool index (CORESETPoolIndex) value being configured for a CORESET may be interchangeably interpreted. In the present disclosure, multi-TRP based on single DCI and at least one codepoint in a TCI field being mapped to two TCI states may be interchangeably interpreted.

In the present disclosure, a cell, a serving cell, a CC, a BWP, a BWP in a CC, a band, a PCI, and QCL type D may be interchangeably interpreted. QCL type D may be interpreted as another QCL type. A serving cell and a primary cell may be interchangeably interpreted. Another cell, a non-serving cell, an additional serving cell, a cell with a different PCI, a candidate serving cell, a cell with a PCI different from a PCI of a serving cell (current serving cell), and another serving cell may be interchangeably interpreted. The TCI state and the TCI may be interchangeably interpreted.

In the present disclosure, L1 beam reporting, beam reporting, a CSI report, a CSI reporting configuration, a CSI configuration, a CSI resource configuration, a resource configuration, resource setting, and the like may be interchangeably interpreted. Reporting and measurement may be interchangeably interpreted. An L1-RSRP, an RSRP, an SINR, an L1-SINR, and a CSI may be interchangeably interpreted. An SSB and an SSB index may be interchangeably interpreted.

In the present disclosure, in inter-cell mobility (for example, L1/L2 inter cell mobility) and inter-cell mobility of a case using multi-TRP, a TRP in a serving cell may be referred to as a primary TRP (pTRP) and a TRP in a non-serving cell may be referred to as an additional TRP (aTRP).

L1/L2 inter-cell, L1/L2 inter-cell mobility, inter-cell mobility, inter-cell operation, inter-cell mobility of a case using multi-TRP, multi-TRP inter-cell, multi-TRP inter-cell mobility, inter-cell multi-TRP, and inter-cell beam management may be interchangeably interpreted.

In the present disclosure, an expression "Rel. XX" indicates a release in 3GPP. Note that a release number "XX" is an example, and may be replaced with another number.

(Radio Communication Method)

Resources/occasions of RSs (for example, SSBs) may overlap with each other between different PCIs/cells. For example, in FR2, RSs corresponding to respective different PCIs/cells each typically have different QCL type D. Note that, in the present disclosure, although an SSB may be used as an example of an RS, an RS in the present disclosure may be another RS (for example, CSI-RS).

Figure 5:
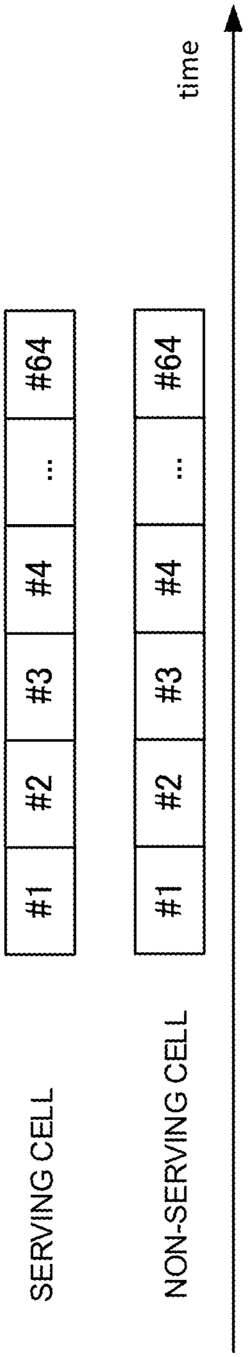
FIG. 5 is a diagram to show an example of a case where SSB resources of a serving cell overlap with SSB resources of a non-serving cell.

FIG. 5 is a diagram to show an example of a case where SSB resources of a serving cell overlap with SSB resources of a non-serving cell. #1 to #64 in FIG. 5 are SSB indices.

When a UE transmits (reports), as capability information, simultaneous reception/measurement of RSs with different QCL type D, the UE may receive RSs corresponding to different PCIs/cells in the same period (symbol/occasion), and perform CSI measurement/reporting (for example, L1-RSRP measurement/reporting) by using the RSS. In this case, the UE can reuse existing scheduling restriction.

When a UE does not transmit (report), as capability information, simultaneous reception/measurement of RSs with different QCL type D, the UE may receive any one RS of RSs that are transmitted in the same period (symbol/occasion) and that correspond to different PCIs/cells, and perform CSI measurement/reporting (for example, L1-RSRP measurement/reporting) by using the RS. In this case, existing scheduling restriction may be updated (first embodiment described below), or existing TCI state switch delay may be updated (second embodiment described below).

First Embodiment

A UE may receive any one RS of RSs that are transmitted in the same period (symbol/occasion) and that correspond to different PCIs/cells, and perform CSI measurement/reporting (for example, L1-RSRP measurement/reporting) by using the RS. In this case, the UE may update (perform) existing scheduling restriction. For example, the UE may restrict transmission/reception of a specific channel/signal. The UE may update (perform) scheduling restriction for an RS related to a PCI of a non-serving cell, for example.

The present embodiment may be applied only to a case where the UE does not transmit (report), as capability information, at least one of support of simultaneous reception/measurement of a plurality of types of signals (RSs (for example, SSBs) or other DL signals) with different QCL type D and support of concurrent intra-frequency measurement on a serving cell or neighboring cell and PDCCH or PDSCH reception from the serving cell with different numerologies (simultaneousRxDataSSB-DiffNumerology), or a case where the UE does not receive/support any specific configuration.

In the present disclosure, transmitting capability information may be interpreted as receiving a configuration corresponding to the capability information. When capability information is transmitted, the UE may receive a configuration corresponding to the capability information.

The scheduling restriction may mean restriction on transmission/reception of a specific channel/signal. In the present disclosure, restriction, drop, stop, cancel, puncture, rate match, postpone, and the like may be interchangeably interpreted.

The scheduling restriction may mean that, for example, when an SSB index (SSB) configured for received power (L1-RSRP) measurement is associated with a non-serving cell (a cell different from a serving cell, a PCI different from a PCI of the serving cell), the UE restricts, in a symbol corresponding to the SSB index (SSB), transmission of a specific channel/signal (PUCCH/PUSCH/SRS or the like) or reception of a specific channel/signal (PDCCH/PDSCH/CSI-RS (CSI-RS for tracking/channel quality indicator (CQI)) or the like) (the UE does not assume/perform the transmission or reception).

When an SSB of a PCI of a non-serving cell is not configured for L1-RSRP measurement, there may be no scheduling restriction for the SSB or may be scheduling restriction.

The scheduling restriction may be only applicable for FR2 or may be applicable for both FR1 and FR2. A reason for application of the scheduling restriction is mainly in a receive beam of the UE. In other words, such a reason is in that, when the UE measures an SSB of a PCI of a non-serving cell, a received beam corresponding to the SSB may be different from a received beam for a PDCCH/PDSCH/CSI-RS from a serving cell.

The scheduling restriction may be only applied between an SSB and a specific channel/signal (for example, PDCCH/PDSCH/CSI-RS/PUCCH/PUSCH/SRS) that correspond to different PCIs. For example, between an SSB of a non-serving cell and the specific channel/signal of a serving cell or between an SSB of a serving cell and the specific channel/signal of a non-serving cell, the scheduling restriction in the same symbol may be applied. This is because received beams are different between a serving cell and a non-serving cell.

Between an SSB of a non-serving cell and a specific channel/signal of the non-serving cell or between an SSB of a serving cell and a specific channel/signal of the serving cell, the scheduling restriction in the same symbol need not be applied. This is because received beams in the same cell have high possibility to be the same.

According to the first embodiment, scheduling restriction in a case where resources/occasions of RSs overlap with each other between different PCIs/cells is made clear, and thus the UE is possible to appropriately perform transmission/reception in this case.

Second Embodiment

A UE may receive any one RS of RSs that are transmitted in the same period (symbol/occasion) and that correspond to different PCIs/cells, and perform CSI measurement/reporting (for example, L1-RSRP measurement/reporting) by using the RS. In this case, existing TCI state switching delay may be updated. A period with at least a part of the TCI state switching delay illustrated in the above-described (TCI State Switching) in the present embodiment being changed may be applied. The UE may update the TCI state switching delay to integer times (X times in a case of $TO_k$=X described below) of the TCI state switching delay, for example.

The TCI state switching delay includes a time period until a next SSB reception. For example, when the UE can measure only an SSB of either a PCI of a serving cell or a PCI of a non-serving cell in the same symbol, more TCI state switching delay is required.

When a target TCI state is associated with a PCI of a non-serving cell or the UE is configured with a TCI state associated with an SSB of the non-serving cell (regardless of whether the target TCI state is associated with a serving cell/non-serving cell), longer switching delay is defined.

Figure 6:
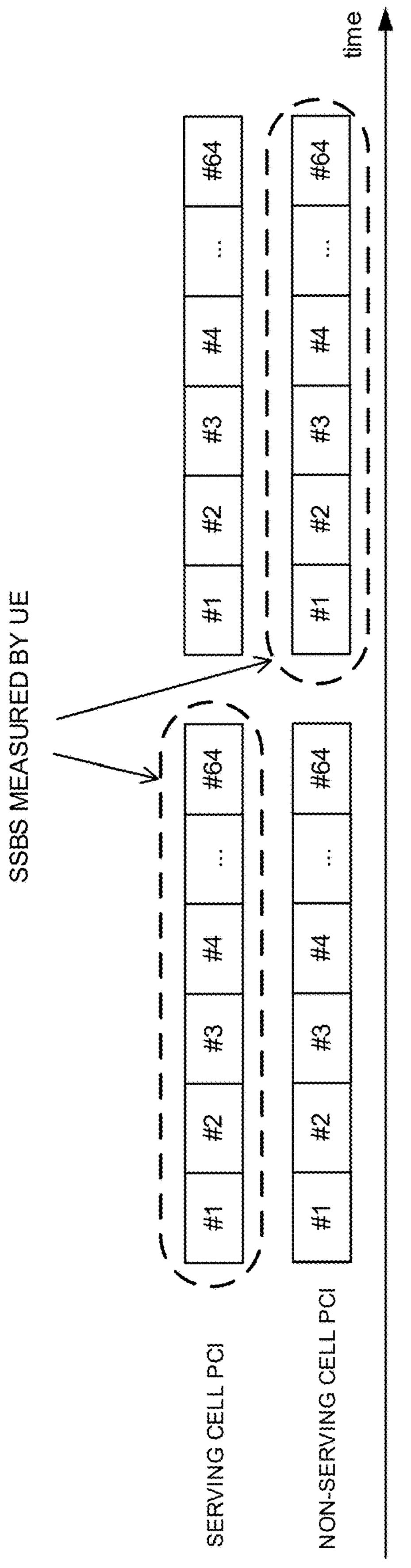
FIG. 6 is a diagram to show an example of a time line of SSB measurement for a serving cell and a non-serving cell according to a second embodiment.

FIG. 6 is a diagram to show an example of a time line of SSB measurement for a serving cell and a non-serving cell according to a second embodiment. In the present embodiment, the UE does not simultaneously receive/measure SSBs of a serving cell and SSBs of a non-serving cell, and thus receives/measures SSBs in different periods. For example, the UE measures SSBs corresponding to the serving cell first and then measures SSBs corresponding to the non-serving cell. This increases TCI state switching delay.

For example, a value indicated in Option A described below may be configured for $TO_k$ illustrated in the above-described (TCI State Switching), and a value indicated in Option B or C described below may be configured for $T_{first\text{-}SSB}$ illustrated in the above-described (TCI State Switching).

{Option A}

If a target TCI state is not in an active TCI state list for a PDSCH and the target TCI state is not associated with a PCI of a serving cell, $TO_k$ may be $TO_k$=2 (or a value greater than 2). Otherwise, $TO_k$ may be $TO_k$=1 if the target TCI state is not in the active TCI list for the PDSCH, or $TO_k$=0 otherwise. In the case of $TO_k$=2 described above, when, for example, a large number of PCIs are configured for TCI state configuration, a greater value may be configurable.

{Option B}

The UE may count the first SSB (SSB measurement) as "the first SSB measurement associated with the target TCI" (corresponding to either the serving cell or non-serving cell).

In this case, $T_{first\text{-}SSB}$ is a time period after a MAC CE command is decoded by the UE until measurement for the first SSB associated with the PCI associated with the target TCI state. The SSB corresponds to QCL type A or QCL type C for the target TCI state, associated with the PCI associated with the target TCI.

{Option C}

The UE may count the first SSB (SSB transmission) as "the second SSB transmission associated with the target TCI" (corresponding to either the serving cell or non-serving cell). Note that transmission may be replaced with reception.

In this case, $T_{first\text{-}SSB}$ may be a time period after a MAC CE command is decoded by the UE until the second SSB transmission associated with the PCI associated with the target TCI state. The SSB corresponds to QCL type A or QCL type C for the target TCI state, associated with the PCI associated with the target TCI. In this case, a base station (gNB) can understand the time line. The UE can measure both SSBs associated with the serving cell and non-serving cell.

In Option C, the "second" may be replaced with another number (Xth). For example, X may be a number corresponding to the number of non-serving cells (non-serving cells that can be used by the UE). X may be configured by higher layer signaling/physical layer signaling in advance.

{Application Conditions}

An application condition for the second embodiment may be to meet at least one of (1) to (3) below. Note that such an application condition may be used as an application condition for the first embodiment.

(1) The UE does not transmit (report), as capability information, at least one of simultaneous reception/measurement of a plurality of types of signals (RSs (for example, SSBs) or other DL signals) with different QCL type D and support of simultaneous PDCCH or PDSCH reception from the serving cell with different numerologies (simultaneousRx-DataSSB-DiffNumerology).

(2) SSB resources/occasions of a serving cell and non-serving cell overlap with each other. Hereinafter, a configuration regarding such overlapping is referred to as an SSB configuration. Note that such overlapping may be a case where at least one symbol overlaps with another or every symbol overlaps with another.

{{Variations }}

A UE may transmit (report), as UE capability information, whether to support that "SSB resources/occasions of a serving cell and non-serving cell are possible to overlap with each other" (hereinafter, referred to as a given function).

When the UE supports the given function described above, a base station (gNB) may perform configuration of L1/L2 inter-cell mobility/multi-TRP inter-cell mobility by using the SSB configuration. Scheduling restriction and/or additional TCI state switching delay may be performed or may not be performed.

When the UE does not support the given function described above, the base station (gNB) need not be able to (need not) perform configuration of at least one of L1/L2 inter-cell mobility and multi-TRP inter-cell mobility, by using the SSB configuration. When the UE does not support the given function described above, the base station (gNB) may configure at least one of L1/L2 inter-cell and multi-TRP inter-cell, by using the SSB configuration.

Note that scheduling restriction and/or additional TCI state switching delay may be performed.

(3) Only FR2 is applied. Alternatively, both FR1 and FR2 are applied.

According to the second embodiment, TCI state switch delay in a case where resources/occasions of RSs overlap with each other between different PCIs/cells is made clear, and thus the UE is possible to appropriately perform transmission/reception in this case.

<UE Capability>

A UE may transmit (report), to a network (base station), UE capability information indicating whether to support at least one of examples in the present disclosure. At least one of the examples in the present disclosure may only be applied for a UE that has transmitted specific UE capability information or a UE that supports the specific UE capability. The UE may receive information (parameters or the like) indicating at least one of the examples in the present disclosure by higher layer signaling/physical layer signaling, and perform control in accordance with the received information. The information may correspond to the UE capability information transmitted by the UE. The UE capability information may be, for example, at least one of (1) to (5) below.

(1) Whether to support L1/L2 inter-cell mobility.

(2) Whether to support multi-TRP inter-cell mobility.

(3) Whether to support simultaneous reception/measurement with different QCL type D.

(4) Whether there is scheduling restriction and/or whether there is additional TCI state switching delay.

(5) Whether SSB resources/occasions of a serving cell and non-serving cell are possible to be overlapped with each other.

Each example in the present disclosure may be applied to at least one of L1/L2 inter-cell mobility and multi-TRP inter-cell mobility. A PCI in the present disclosure may be replaced with a new index corresponding to at least one of PCIs configured.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
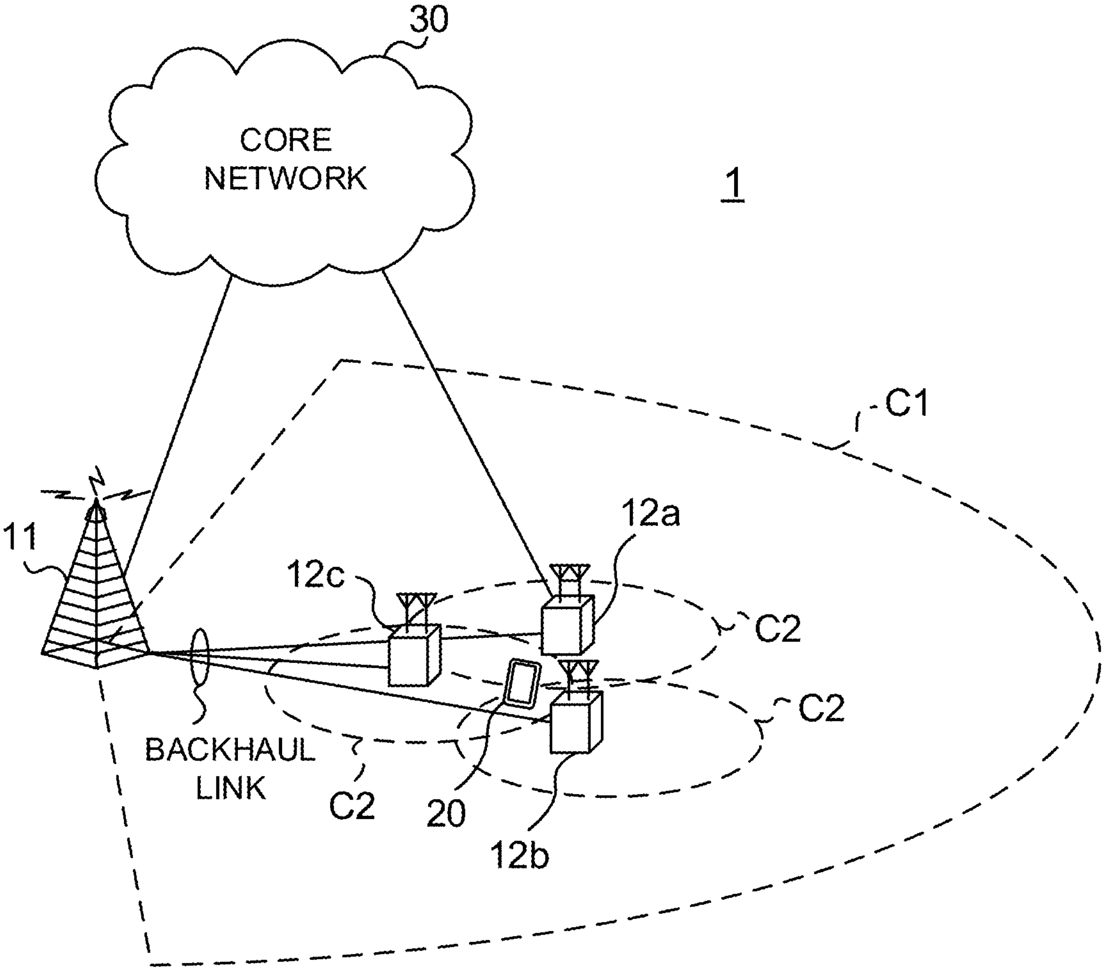
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12*a* to 12*c*) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node." The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data."

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a reference signal for measurement (Sounding Reference Signal (SRS)), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
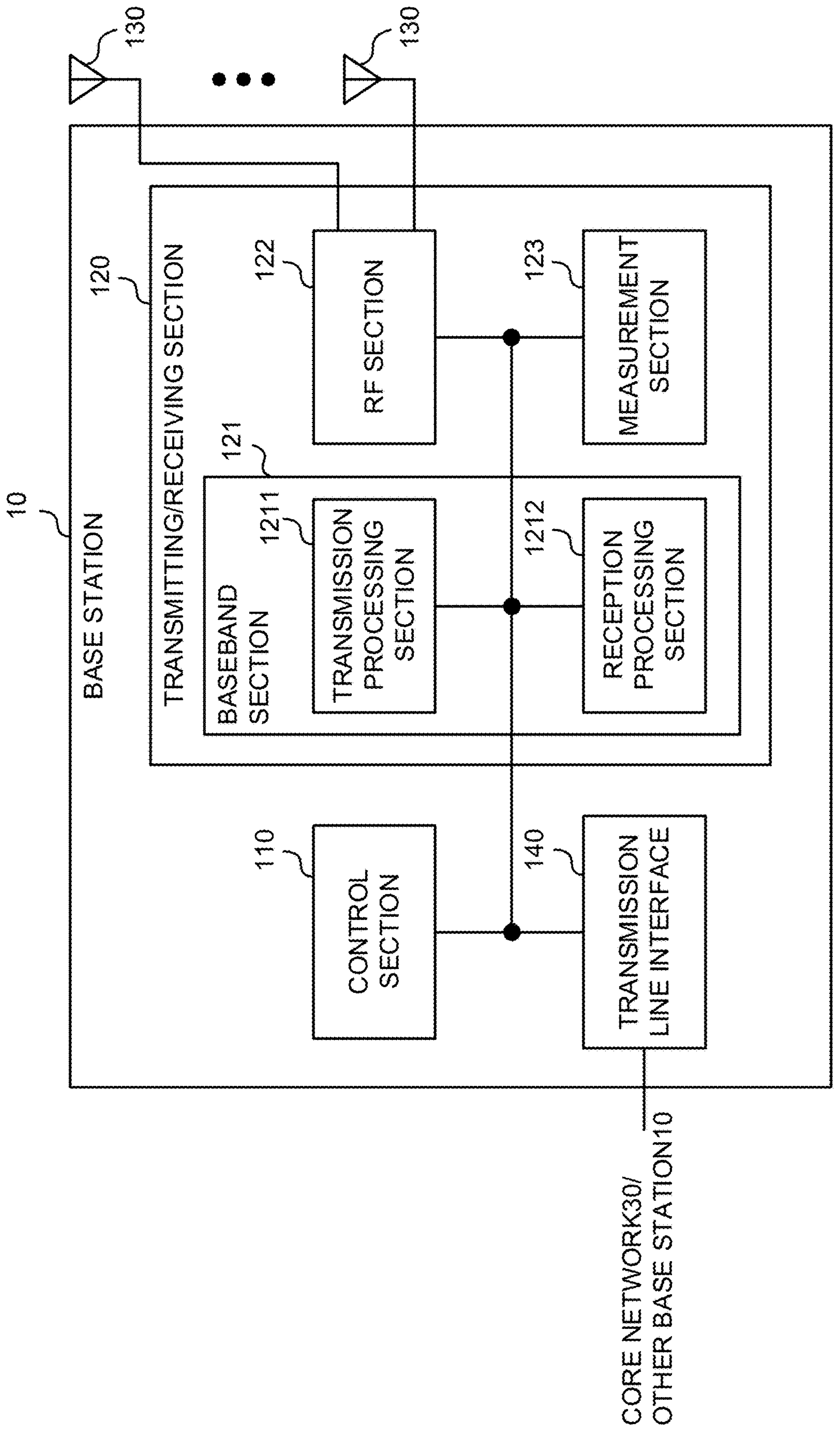
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), mac layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, in the same period, any one reference signal of a plurality of reference signals corresponding to different cells.

The control section 110 may control at least one of restriction on transmission or reception of a specific channel or signal and update on transmission Configuration Indication (TCI) state switching delay in a terminal.

(User Terminal)

Figure 9:
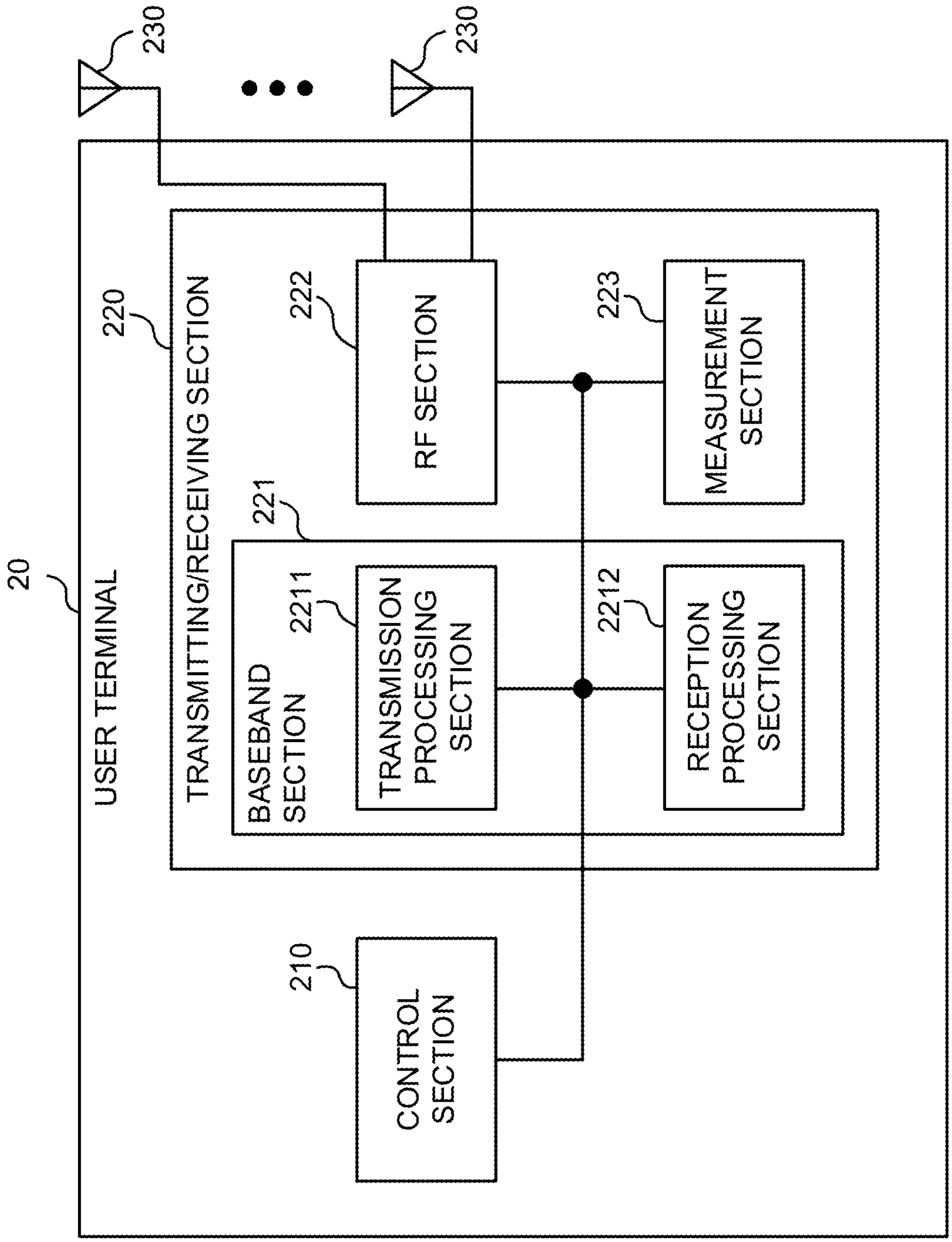
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal.

For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive any one reference signal of a plurality of reference signals that are transmitted in the same period and that correspond to different cells.

The control section 210 may control at least one of restriction on transmission or reception of a specific channel or signal and update on transmission Configuration Indication (TCI) state switching delay.

When a synchronization signal block (SSB) configured for received power measurement is associated with a non-serving cell, the control section 210 may restrict, in a symbol corresponding to the SSB, the transmission or reception of the specific channel or signal.

The control section 210 may update the TCI state switching delay to integer times of the TCI state switching delay.

When simultaneous reception or simultaneous measurement of a plurality of types of signals with different Quasi-Co-Location (QCL types) is not transmitted as capability information, the control section 210 may control at least one of the restriction on the transmission or reception of the specific channel or signal and the update on the TCI state switching delay.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
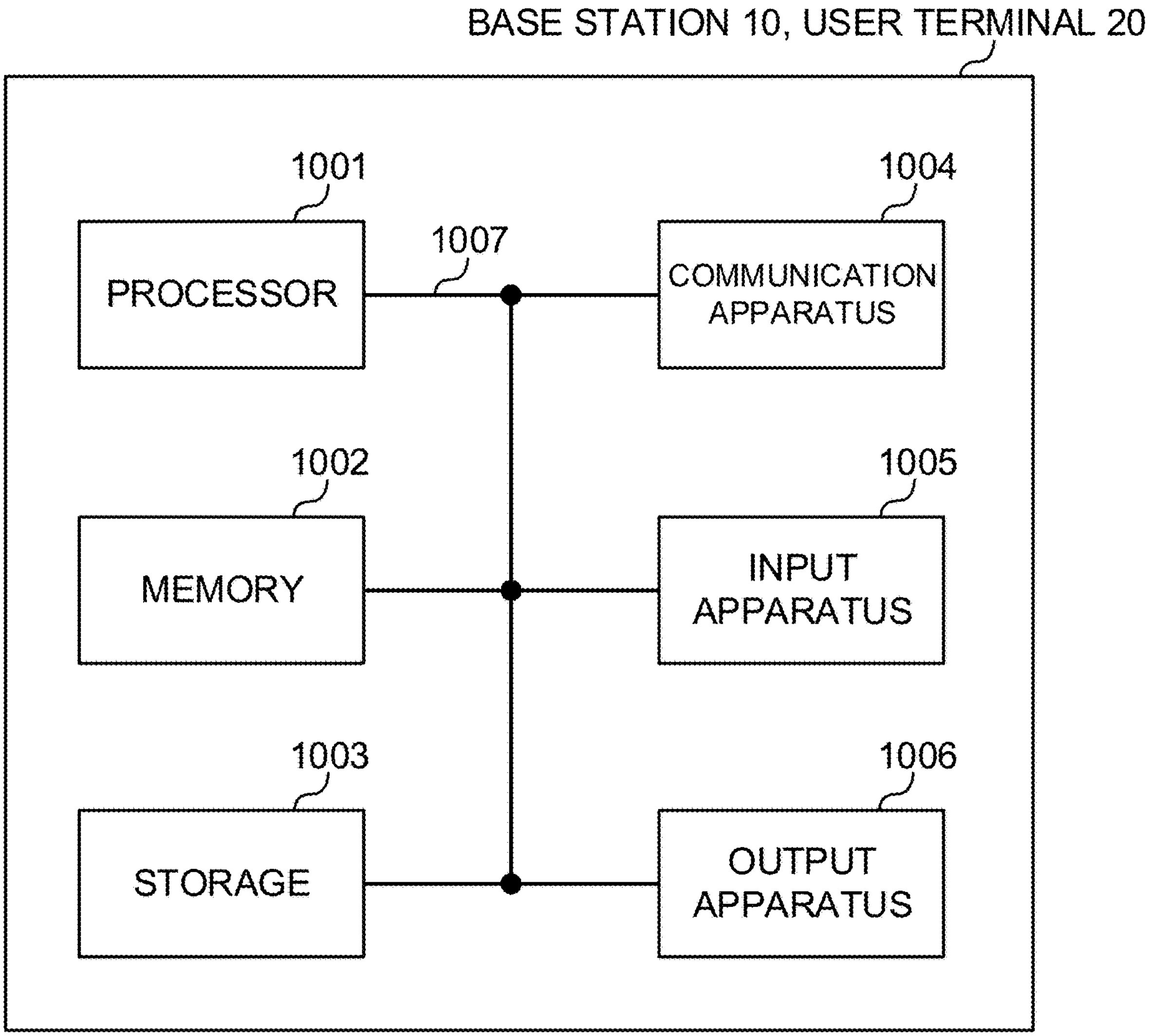
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment.

Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A Slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIS.

Note that, in the case where one slot or one mini-slot is referred to as a TTI, one or more TTIS (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP."

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, notification of information in the present disclosure may be implemented by using physical layer signaling (for example, downlink control information (DCI), uplink control information (UCI)), higher layer signaling (for example, Radio Resource Control (RRC) signaling, broadcast information (master information block (MIB), system information blocks (SIBs), and so on), Medium Access Control (MAC) signaling), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. MAC signaling may be notified using, for example, MAC control elements (MAC CEs).

Notification of given information (for example, notification of "being X") does not necessarily have to be notified explicitly, and can be notified implicitly (by, for example, not notifying this given information or notifying another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be a device mounted on a moving object or a moving object itself, and so on.

The moving object is a movable object with any moving speed, and naturally a case where the moving object is stopped is also included. Examples of the moving object include a vehicle, a transport vehicle, an automobile, a motorcycle, a bicycle, a connected car, a loading shovel, a bulldozer, a wheel loader, a dump truck, a fork lift, a train, a bus, a trolley, a rickshaw, a ship and other watercraft, an airplane, a rocket, a satellite, a drone, a multicopter, a quadcopter, a balloon, and an object mounted on any of these, but these are not restrictive. The moving object may be a moving object that autonomously travels based on a direction for moving.

The moving object may be a vehicle (for example, a car, an airplane, and the like), may be a moving object which moves unmanned (for example, a drone, an autonomous vehicle, and the like), or may be a robot (a manned type or unmanned type). Note that at least one of a base station and a mobile station also includes an apparatus which does not necessarily move during communication operation. For example, at least one of a base station and a mobile station may be an Internet of Things (IOT) device such as a sensor.

Figure 11:
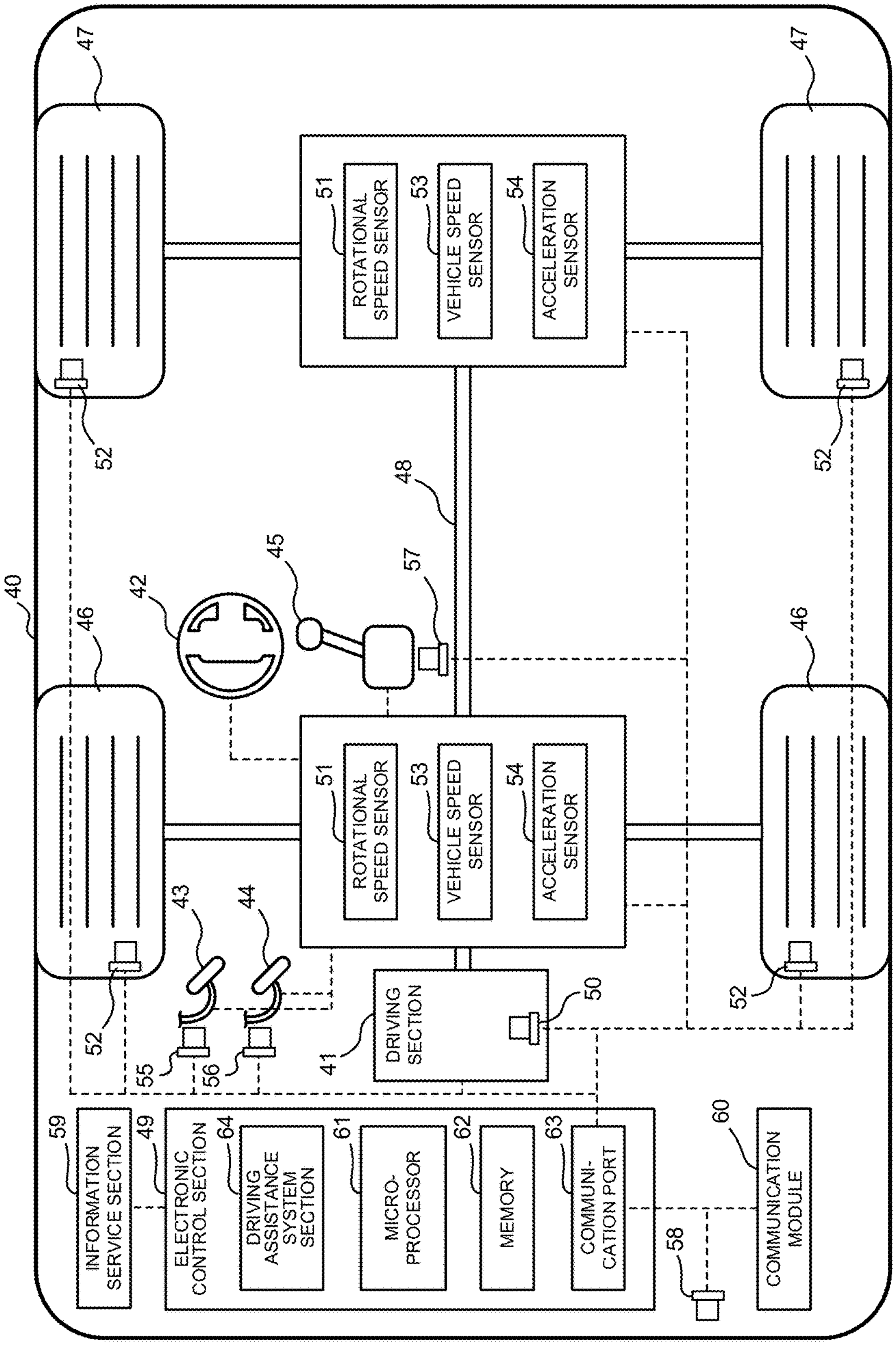
FIG. 11 is a diagram to show an example of a vehicle according to one embodiment.

FIG. 11 is a diagram to show an example of a vehicle according to one embodiment. A vehicle 40 includes a driving section 41, a steering section 42, an accelerator pedal 43, a brake pedal 44, a shift lever 45, right and left front wheels 46, right and left rear wheels 47, an axle 48, an electronic control section 49, various sensors (including a current sensor 50, rotational speed sensors 51, pneumatic sensors 52, vehicle speed sensors 53, acceleration sensors 54, an accelerator pedal sensor 55, a brake pedal sensor 56, a shift lever sensor 57, and an object detection sensor 58), an information service section 59, and a communication module 60.

The driving section 41 includes, for example, at least one of an engine, a motor, and a hybrid of an engine and a motor. The steering section 42 at least includes a steering wheel, and is configured to steer at least one of the front wheels 46 and the rear wheels 47, based on operation of the steering wheel operated by a user.

The electronic control section 49 includes a microprocessor 61, a memory (ROM, RAM) 62, and a communication port (for example, an input/output (IO) port) 63. The electronic control section 49 receives, as input, signals from the various sensors 50 to 58 included in the vehicle. The electronic control section 49 may be referred to as an Electronic Control Unit (ECU).

Examples of the signals from the various sensors 50 to 58 include a current signal from the current sensor 50 for sensing current of a motor, rotational speed signals of the front wheels 46/rear wheels 47 acquired by the rotational speed sensors 51, pneumatic signals of the front wheels 46/rear wheels 47 acquired by the pneumatic sensors 52, vehicle speed signals acquired by the vehicle speed sensors 53, acceleration signals acquired by the acceleration sensors 54, a depressing amount signal of the accelerator pedal 43 acquired by the accelerator pedal sensor 55, a depressing amount signal of the brake pedal 44 acquired by the brake pedal sensor 56, an operation signal of the shift lever 45 acquired by the shift lever sensor 57, and a detection signal for detecting an obstruction, a vehicle, a pedestrian, and the like acquired by the object detection sensor 58.

The information service section 59 includes various devices for providing (outputting) various pieces of information such as drive information, traffic information, and entertainment information, such as a car navigation system, an audio system, a speaker, a display, a television, and a radio, and one or more ECUs that control these devices. The information service section 59 provides various pieces of information/services (for example, multimedia information/multimedia service) for an occupant of the vehicle 40, using information acquired from an external apparatus via the communication module 60 and the like.

The information service section 59 may include an input device (for example, a keyboard, a mouse, a microphone, a switch, a button, a sensor, a touch panel, and the like) for receiving input from the outside, or may include an output device (for example, a display, a speaker, an LED lamp, a touch panel, and the like) for implementing output to the outside.

A driving assistance system section 64 includes various devices for providing functions for preventing an accident and reducing a driver's driving load, such as a millimeter wave radar, Light Detection and Ranging (LiDAR), a camera, a positioning locator (for example, a Global Navigation Satellite System (GNSS) and the like), map information (for example, a high definition (HD) map, an autonomous vehicle (AV) map, and the like), a gyro system (for example, an inertial measurement apparatus (inertial measurement unit (IMU)), an inertial navigation apparatus (inertial navigation system (INS)), and the like), an artificial intelligence (AI) chip, and an AI processor, and one or more ECUS that control these devices. The driving assistance system section 64 transmits and receives various pieces of information via the communication module 60, and implements a driving assistance function or an autonomous driving function.

The communication module 60 can communicate with the microprocessor 61 and the constituent elements of the vehicle 40 via the communication port 63. For example, via the communication port 63, the communication module 60 transmits and receives data (information) to and from the driving section 41, the steering section 42, the accelerator pedal 43, the brake pedal 44, the shift lever 45, the right and left front wheels 46, the right and left rear wheels 47, the axle 48, the microprocessor 61 and the memory (ROM, RAM) 62 in the electronic control section 49, and the various sensors 50 to 58, which are included in the vehicle 40.

The communication module 60 can be controlled by the microprocessor 61 of the electronic control section 49, and is a communication device that can perform communication with an external apparatus. For example, the communication module 60 performs transmission and reception of various pieces of information to and from the external apparatus via radio communication. The communication module 60 may be either inside or outside the electronic control section 49. The external apparatus may be, for example, the base station 10, the user terminal 20, or the like described above. The communication module 60 may be, for example, at least one of the base station 10 and the user terminal 20 described above (may function as at least one of the base station 10 and the user terminal 20).

The communication module 60 may transmit at least one of signals from the various sensors 50 to 58 described above input to the electronic control section 49, information obtained based on the signals, and information based on an input from the outside (a user) obtained via the information service section 59, to the external apparatus via radio communication. The electronic control section 49, the various sensors 50 to 58, the information service section 59, and the like may be referred to as input sections that receive input. For example, the PUSCH transmitted by the communication module 60 may include information based on the input.

The communication module 60 receives various pieces of information (traffic information, signal information, inter-vehicle distance information, and the like) transmitted from the external apparatus, and displays the various pieces of information on the information service section 59 included in the vehicle. The information service section 59 may be referred to as an output section that outputs information (for example, outputs information to devices, such as a display and a speaker, based on the PDSCH received by the communication module 60 (or data/information decoded from the PDSCH)).

The communication module 60 stores the various pieces of information received from the external apparatus in the memory 62 that can be used by the microprocessor 61. Based on the pieces of information stored in the memory 62, the microprocessor 61 may perform control of the driving section 41, the steering section 42, the accelerator pedal 43, the brake pedal 44, the shift lever 45, the right and left front wheels 46, the right and left rear wheels 47, the axle 48, the various sensors 50 to 58, and the like included in the vehicle 40.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "sidelink"). For example, an uplink channel, a downlink channel and so on may be interpreted as a sidelink channel.

Likewise, the user terminal in the present disclosure may be interpreted as base station. In this case, the base station 10 may have the functions of the user terminal 20 described above.

Operations which have been described in the present disclosure to be performed by a base station may, in some cases, be performed by an upper node of the base station. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods, next-generation systems that are enhanced, modified, created, or defined based on these, and the like. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of operations. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some operations.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B are each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:

a receiver that receives a reference signal for received power measurement in a cell having a different physical cell ID (PCI) from a serving cell, the reference signal corresponding to a symbol to which scheduling restriction is applied, the scheduling restriction including not performing transmission of uplink (UL) channels and signals in the symbol and not performing reception of downlink (DL) channels and signals in the symbol; and a processor that, when the symbol overlaps with an other symbol corresponding to a reference signal for received power measurement in the serving cell, applies a transmission configuration indication (TCI) state switching delay that is longer than a TCI state switching delay applied when the symbol does not overlap with the other symbol.

2. A radio communication method for a terminal, comprising:

receiving a reference signal for received power measurement in a cell having a different physical cell ID (PCI) from a serving cell, the reference signal corresponding to a symbol to which scheduling restriction is applied, the scheduling restriction including not performing transmission of uplink (UL) channels and signals in the symbol and not performing reception of downlink (DL) channels and signals in the symbol; and when the symbol overlaps with an other symbol corresponding to a reference signal for received power measurement in the serving cell, applying a transmission configuration indication (TCI) state switching delay that is longer than a TCI state switching delay applied when the symbol does not overlap with the other symbol.

3. A base station comprising:

a transmitter that transmits a reference signal for received power measurement in a cell having a different physical cell ID (PCI) from a serving cell, the reference signal corresponding to a symbol to which scheduling restriction is applied, the scheduling restriction including not performing transmission of uplink (UL) channels and signals in the symbol and not performing reception of downlink (DL) channels and signals in the symbol; and a processor that, when the symbol overlaps with an other symbol corresponding to a reference signal for received power measurement in the serving cell, applies a transmission configuration indication (TCI) state switching delay that is longer than a TCI state switching delay applied when the symbol does not overlap with the other symbol.

4. A system comprising: a terminal; and a base station, wherein the terminal comprises:

a receiver that receives a reference signal for received power measurement in a cell having a different physical cell ID (PCI) from a serving cell, the reference signal corresponding to a symbol to which scheduling restriction is applied, the scheduling restriction including not performing transmission of uplink (UL) channels and signals in the symbol and not performing reception of downlink (DL) channels and signals in the symbol; and a processor that, when the symbol overlaps with an other symbol corresponding to a reference signal for received power measurement in the serving cell, applies a transmission configuration indication (TCI) state switching delay that is longer than a TCI state switching delay applied when the symbol does not overlap with the other symbol, and the base station comprises:

a transmitter that transmits the reference signal.

* * * * *